United States Patent [19]

Hamada et al.

[11] 4,311,062
[45] Jan. 19, 1982

[54] COUNTERSHAFT GEAR TRANSMISSION

[75] Inventors: Hideo Hamada, Yokosuka; Masaaki Suga, Yokohama, both of Japan

[73] Assignee: Nissan Motor Company, Ltd., Yokohama, Japan

[21] Appl. No.: 45,067

[22] Filed: Jun. 4, 1979

[30] Foreign Application Priority Data

Jun. 19, 1978 [JP] Japan .................. 53-73246

[51] Int. Cl.³ .................. F16H 3/10; B60K 41/06; F16D 47/04
[52] U.S. Cl. .................. 74/333; 74/337; 74/357; 74/359; 74/360; 74/856; 74/865; 74/866; 74/364; 192/48.6; 192/48.92
[58] Field of Search .................. 74/357, 359, 362–364, 74/333, 325, 360, 337, 336 R; 192/48.1, 48.92, 48.6

[56] References Cited

U.S. PATENT DOCUMENTS

| Re. 20,685 | 4/1938 | Burtnett | 192/48.6 X |
| 2,012,087 | 8/1935 | Nardone | 192/48.92 |
| 2,023,198 | 12/1935 | Fishburn | 192/48.6 X |
| 2,632,541 | 3/1953 | Dunn | 192/48.6 |

FOREIGN PATENT DOCUMENTS

| 911080 | 5/1954 | Fed. Rep. of Germany . |
| 1279485 | 10/1968 | Fed. Rep. of Germany . |
| 2064267 | 2/1970 | Fed. Rep. of Germany . |
| 1927619 | 12/1970 | Fed. Rep. of Germany . |

Primary Examiner—Leslie Braun
Attorney, Agent, or Firm—Thompson, Birch, Gauthier & Samuels

[57] ABSTRACT

A countershaft gear transmission is disclosed wherein a plurality of main gears including a first main gear and a second main gear rotatably mounted to a main or output shaft, a countershaft drivingly connected to an input shaft has counter gears in constant engagement with the plurality of main gears and wherein when a low gear ratio is established the first main gear transfers power from the countershaft to the main shaft and when a high gear ratio is established the second main gear transfers power. The first main gear is formed on an outer race of a one-way clutch whose inner race is free to rotate on the main shaft. A synchronizer is coupled with the main shaft for coupling the inner race of the one-way clutch with the main shaft in all of the forward gear ratios. A disc clutch is coupled with the main shaft for coupling said second main gear with said main shaft in the high gear ratio.

2 Claims, 2 Drawing Figures

COUNTERSHAFT GEAR TRANSMISSION

FIELD OF THE INVENTION

The present invention relates to a countershaft gear transmission.

BACKGROUND OF THE INVENTION

The conventional countershaft gear transmissions comprise a plurality of main gears including a highest gear ratio main gear fixed to a main shaft and the remaining gears which are free to rotate on the main shaft wherein a desired one of the main gears falling into the latter group is selectively coupled with or engaged with the main shaft to establish a power flow path in a desired gear ratio. For shifting between the adjacent gear ratios in the countershaft gear transmission, a clutch, operatively disposed between engine crankshaft and the input shaft of the transmission, has to be disengaged to permit shifting operation in the transmission with the input shaft being subjected to no torque stress.

Under vehicle operating conditions with high loads, including acceleration, a power transmission element following a transmission, such as a propeller shaft, is twisted by an output torque from the transmission before a clutch is disengaged so that when the clutch is disengaged, the torsion is removed to permit the propeller shaft to suddenly return to its normal state together with a countershaft and the like which have a large inertia, thereby to jolt the vehicle, degrading riding quality of the vehicle. This tendency becomes perceivable particularly when a shift is made from the lowest gear ratio, which provides a large speed reduction, to the next gear ratio which also has a large speed reduction, since under this operating condition an output torque from a transmission is considerably large, thus requiring the development of various countermeasures.

SUMMARY OF THE INVENTION

The present invention, accordingly resides in the conception of improving a countershaft gear transmission wherein shifting between a gear ratio and the next or adjacent high gear ratio can be effected without disconnecting engine power from an input shaft of the transmission.

Speaking more specifically, the present invention takes the form of a countershaft gear transmission which comprises an input shaft, a countershaft drivingly connected to the input shaft, a main shaft, a plurality of main gears, which includes a first main gear and a second main gear, in constant engagement with counter gears of the countershaft, a one-way clutch which includes an inner race rotatably mounted to the main shaft and an outer race formed with the first main gear. The second main gear is rotatably mounted to the main shaft. Means is coupled with the main shaft for coupling the inner race of the one-way clutch with the main shaft in all forward gear ratios including a predetermined gear ratio and the next high gear ratio. Clutch means is coupled with the main shaft for coupling said second main gear with the main shaft in the high gear ratio. The one-way clutch is constructed such that it allows the inner race to overrun the outer race, thus absorbing a difference in rotational speed between the inner race and the outer race, formed with the first main gear, when the predetermined gear ratio is established in the transmission, and such that when the next high gear ratio is established, it allows unitary rotation of the inner race and the outer race. Whereby shifting between said predetermined and high gear ratios can be effected with the input shaft being subjected to torque.

Accordingly an object of the present invention is to provide a countershaft gear transmission wherein shifting can be effected between a predetermined gear ratio and the next gear ratio with an input shaft thereof being subjected to torque.

BRIEF DESCRIPTION OF THE DRAWINGS

The present invention will be described hereinafter in connection with the accompanying drawings, wherein.

DESCRIPTION OF THE EMBODIMENT

Figure 1:
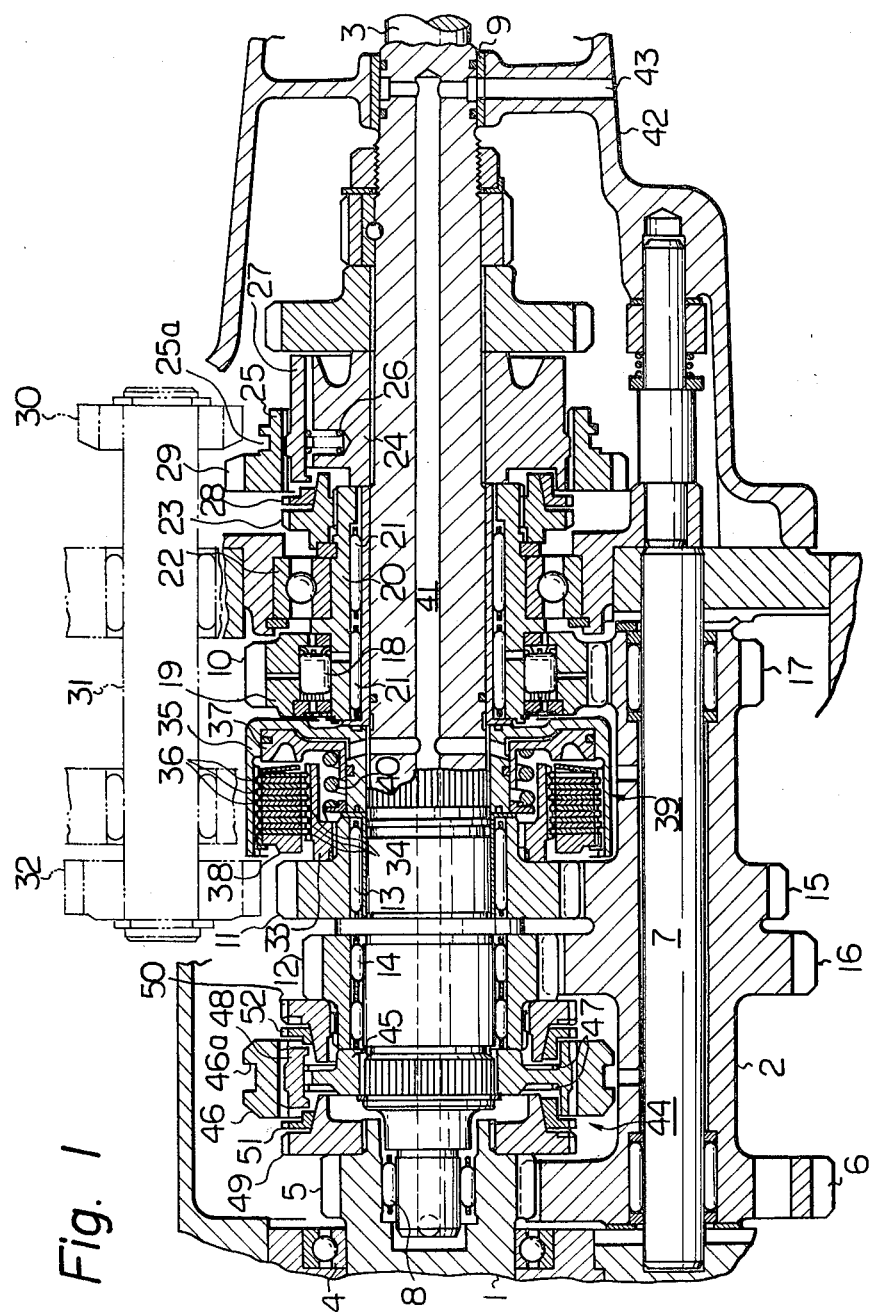
FIG. 1 is a longitudinal sectional view of a countershaft gear transmission according to the present invention.

FIG. 1 shows an overall view of a countershaft gear transmission and in this figure the reference numeral 1 denotes an input shaft of the transmission, the reference numeral 2 a countershaft, the reference numeral 3 an output or main shaft, wherein they are arranged in the same manner as are in the conventional countershaft gear transmission. The input shaft 1 is supported at a bearing 4 and formed at an axial end with a drive gear 5; the countershaft 2 has a gear 6 meshing with the drive gear 5 and is rotatably supported by an axle 7. The main shaft 3 is supported at one end thereof within a bore recessed from the end face of the input shaft 1 via a bearing 8 and is supported at the other end by a bushing 9.

To the main shaft 3 rotatably mounted are a first gear ratio main gear 10, a second gear ratio main gear 11 and a third gear ratio main gear 12. The main gears 11, 12 are free to rotate on the main shaft 3 via bearings 13, 14, respectively, in the conventional manner and are in constant meshing engagement with counter gears 15, 16, respectively, of the countershaft 2; the main gear 10 which is in constant meshing engagement with a counter gear 17 of the countershaft 2 is formed on an outer race 19 of a one-way clutch 18 which has an inner race 20 rotatably mounted to the main shaft 3 via bearings 21, 21. The inner race 20 extends in a direction away from the main gear 11 and the extended portion is supported at its outer periphery by a bearing 22 and has an end portion externally splined to a clutch gear 23.

The clutch gear 23 cooperates with a synchrohub 24 splined to the main shaft 3, a coupling sleeve 25 splined to an outer periphery of the synchrohub, inserts 27 and a balk ring 28 to form a synchronizer, wherein the inserts are disposed between the synchrohub and the coupling sleeve so as to urge latter radially outwardly under the action of spring means 26 and the clutch gear 23 is formed with a conical surface on which the balk ring is fitted. Formed on the outer peripheral surface of the coupling sleeve 25 are a circumferential groove 25a for receiving an end of a shift fork (not shown) and a reverse gear 29. This reverse gear 29 can mesh with a reverse idler gear 30. The reverse idler gear 30 is fixed to one end of a reverse idler shaft 31 for unitary rotation which has at the opposite end, a gear 32 which is in constant meshing engagement with the counter gear 15 of the countershaft 2.

A hydraulically operated multiple disc clutch 39 is provided which is coupled with the main shaft 3 and is operative to couple the main gear 11 with main shaft 3.

A clutch hub 33 is splined to the main gear 11 and drive plates 34 are splined to an outer periphery of the clutch hub. The clutch hub 33 is surrounded by a clutch drum 35 which is splined to the main shaft and this clutch drum 35 is internally splined to provide a spline connection with driven plates 36 and slidably receives a piston 37. At the open end of the clutch drum 35 is fixed a reaction member 38 and between this reaction member and the piston 37 the drive and driven plates 34, 36 are arranged alternately. The piston 37 is biased by a return spring 40 in a direction away from the plates 34, 36 assembly and for urging the piston against this return spring, a passage 41 is formed through the main shaft 3 for introduction of oil to act on the piston. The passage 41 is in constant communication with a radial port passage 43 formed through a rear extension 42 to which a clutch operating oil pressure is supplied when necessary.

Operatively disposed between the gear 5 and main gear 12 is a synchronizer 44 which is of the conventional type and comprises a synchrohub 45 splined to the main shaft 3, a coupling sleeve 46 splined to the outer periphery of the synchrohub, inserts 48, urged radially outwardly by spring means 47 between the synchrohub and coupling sleeve, clutch gears 49, 50 splined to the gears 5 and 12, respectively, and balk rings 51, 52 which are fitted on conical surfaces of the clutch gears, respectively. Furthermore, the coupling sleeve 46 is formed at an outer periphery with a groove 46a for receiving a shift fork (not shown).

Figure 2:
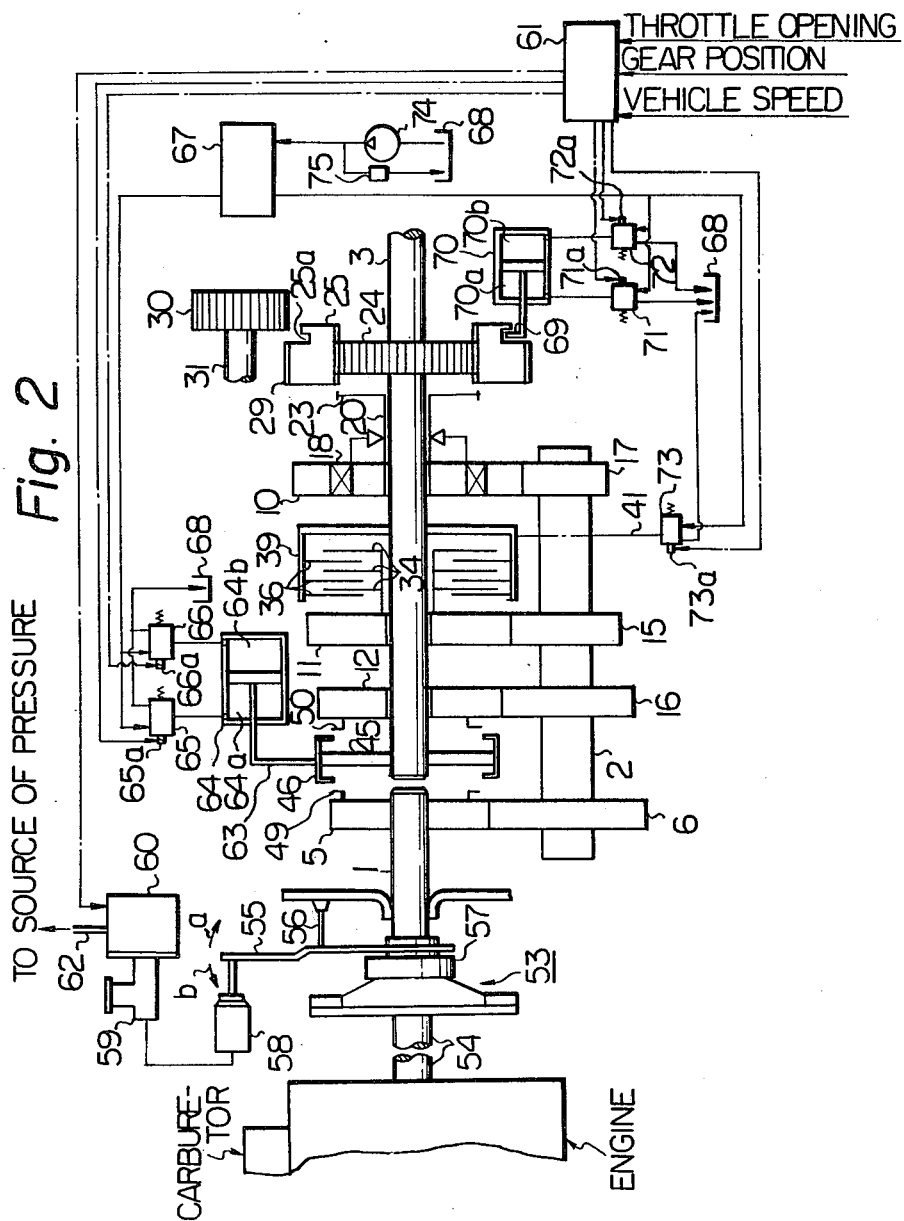
FIG. 2 is a system diagram wherein the transmission according to the present invention is used.

The countershaft gear transmission constructed as mentioned above may be controlled automatically and in this case its control system is constructed as illustrated in FIG. 2. For ease of illustration, the gear train is diagrammatically shown in this figure and the portions corresponding to those of FIG. 1 are designated by the same reference numerals as in FIG. 1.

In FIG. 2, the reference numerals 53 denotes a main clutch which is operatively disposed between an engine output shaft 54 and the transmission input shaft 1. The main clutch 53 is disengaged to disconnect transfer of power from the engine output shaft 54 to the input shaft 1 when the withdrawal lever 55 is moved in a rotational direction of an arrow a about a pivot 55. When the force causing the above mentioned movement of the withdrawal lever 55 is eliminated, the return force of the clutch disc spring returns the withdrawal lever 55 in a direction of arrow b, thus reengaging the clutch 53 to permit the transfer of the power from the engine output shaft 54 to the input shaft 1.

For the above mentioned operation of the withdrawal lever 55, an operating cylinder 58 is provided as connected with a master cylinder 59 which is operated by a hydraulic clutch control unit 60. The clutch control unit 60 includes a hydraulic servo for operating the master cylinder 59 and means, such as a three-way solenoid valve, which is operative to supply hydraulic pressure to the hydraulic servo from a conduit 62 in response to a clutch disengaging signal from a computer 61. The hydraulic servo, when supplied with hydraulic pressure, causes the master cylinder to deliver hydraulic pressure to the operating cylinder 58 to energize same. If the clutch disengaging signal disappears, the three-way solenoid valve is deenergized so that hydraulic servo permits the master cylinder 59 to return to its rest condition. Under this condition the hydraulic servo communicates only with an oil reservoir under the control of the three-way solenoid valve.

Although a hydraulic servo is used in the clutch control unit 60, a vacuum actuated servo may be used alternatively in the clutch control unit 60. The clutch control unit incorporating a vacuum actuated servo is disclosed in U.S. patent application Ser. No. 788,549, filed on Apr. 18, 1977 now U.S. Pat. No. 4,194,608 by Keizaburo USUI et al. and commonly assigned herewith and reference thereto may be made for a more complete description of the construction and operation of the clutch control unit 60.

A shift fork 63 fits in the groove 46a of coupling sleeve 46 and is operatively connected with an actuator 64 of the reciprocating cylinder type which has working chambers 64a, 64b, each being communicable selectively with an accumulator 67, which acts as a hydraulic source, or with an oil reservoir 68, as the situation requires, under the control of solenoid valve 65 or 66. Referring next to a shift fork 69 fitting in the groove 25a of the coupling sleeve 25, it is operatively connected with an actuator 70 of the reciprocating cylinder type which has working chambers 70a, 70b, each being communicable selectively with the accumulator 67 or with the oil reservoir 68. Referring to the oil passage 41 leading from the multiple disc clutch 39, it is communicable selectively with the accumulator 67 or with the oil reservoir 68 through a solenoid valve 73 as the situation demands.

All of the above mentioned solenoid valves 65, 66, 71, 72, 73 are in the form of a three-way solenoid valve which normally takes a position allowing the corresponding working chamber 64a, 64b, 70a or 70b or passage 41 to communicate only with the oil reservoir 68 and which, when energized, takes a position allowing the corresponding working chamber 64a, 64b, 70a or 70b or passage 41 to communicate only with the accumulator 67.

The accumulator 67 is supplied with a hydraulic pressure from an oil pump 74 which may be engine driven, for example, and is provided with an unload or relief or pressure maintaining valve 75 with which the inside of the accumulator 67 is maintained at a constant pressure.

Referring to the computer 61, it is fed with a signal representing vehicle speed, a signal representing gear position and a signal representing throttle opening degree and performs arithmetic operations to produce signals for the clutch control unit 60 and the solenoid valves 65a, 66a, 71a, 72a, 73a, in accordance with programmed schedule order to effect an automatic shifting in the countershaft gear transmission in accordance with operating conditions of the vehicle.

The computer 61 or control circuit is similar to the control circuit and its associated elements disclosed in U.S. patent application Ser. No. 788,549, filed on Apr. 18, 1977, now U.S. Pat. No. 4,194,608 by Keizaburo USUI et al. and commonly assigned herewith, and reference thereto may be made for a more complete description of the operation of the computer 61. Briefly the countershaft gear transmission operates as follows under the control of the computer 61.

When it is required to move the vehicle from a standstill, the computer 61 feeds a clutch disengaging signal to the clutch control unit 60. This causes the clutch control unit 60 to energize the master cylinder 59 by feeding hydraulic pressure to it from the conduit 62. With hydraulic pressure delivered by the master cylinder, the operating cylinder 58 is energized to move the withdrawal lever 55 in the rotational direction of the arrow a, thus disengaging the main clutch 53. After the clutch has been disengaged, the computer 61 feeds a signal to the solenoid 72a to energize same. The energization of this solenoid causes the actuator chamber 70b to connect with the accumulator 67 through the solenoid valve 72. This energizes the actuator 70 so that it moves the coupling sleeve 25 via the shift fork 69 into meshing engagement with the clutch gear 23 under a condition wherein the coupling sleeve 25 is maintained in meshing engagement with the synchrohub 24. Upon completion of this operation, which is detected by stroke sensing of the actuator 70, the computer 61 ceases to feed the signal to the solenoid 72a, but the thus established meshing condition is held by means of a detent mechanism, not shown. At the same time, the computer 61 ceases to feed the signal to the clutch control unit 60 and thus the clutch control unit permits the master cylinder to return to its initial rest position. This permits the main clutch 53 to return, under the return action of the disc spring thereof, to the engaged condition while permitting the withdrawal lever to move in the rotational direction of the arrow b back to its initial position, as illustrated in FIG. 2. As a result of this, power is permitted to transfer from the engine output shaft 54 to the main shaft 3 through, in the subsequent order, the main clutch 53, input shaft 1, drive gear 5 counter gear 6, countershaft 2, counter gear 17, main gear 10, one-way clutch 18, inner race 20, clutch gear 23, coupling sleeve 25, and synchrohub 24, thus establishing a power path in the first gear ratio enabling the movement of the vehicle from standstill.

Upon making an upshift to the second ratio, the computer 61 feeds a signal to the solenoid 73a, while maintaining the above mentioned state for the first gear ratio wherein the first main gear 10 is kept in a driving connection with the main shaft 3 via the one-way clutch 18, coupling sleeve 25 and synchrohub 24, and the main clutch 53 kept engaged. As a result, the solenoid valve 73 permits the conduit 41 to connect with the accumulator 67, allowing the accumulator pressure to urge the piston 37 (ref. FIG. 1) of the multiple disc clutch 39 to press the drive plates 34 and driven plates 36 between the piston and the reaction member 38. Now the clutch hub 33 is drivingly connected to the clutch drum 35 via the plates 34, 36 to drivingly connect the main gear 11 (for the second gear ratio) to the main shaft 3 via the clutch 39 so that engine power is transfered from the countershaft 2 to the main shaft 3 also through the main gear 11 and clutch 39. Under this condition the main gear 11 turns at a speed higher than a speed at which the gear 10 turns since a speed reduction between the gears 10 and 17 is smaller than that between the gears 11 and 15, so that the main shaft 3 is driven to turn at the same revolution speed as the main gear 11 by the countershaft through the gears 15, 11 and clutch 39. Under this condition, the main shaft 3 is allowed to turn at speeds in the second gear ratio, though this rotation is transferred to the inner race 20 of the one-way clutch 18, since the one-way clutch 18 allows the inner race 20 to overrun, viz, rotation of the inner race 20 at the same speed as the main shaft 3, the outer race 19, thus absorbing a difference in rotational speed between the inner race 20 and the gear 10.

Upon making an upshift to a third gear ratio, the computer 61 ceases to feed the signal to the solenoid 73a and begins to feed a signal to the clutch control unit 60.

As a result, the solenoid valve 73 permits the conduit 41 to connect with the oil reservoir 68 to allow the spring 40 to move the clutch piston 37 (ref. FIG. 1) to a position wherein the clutch 39 is disengaged, and the clutch control unit 60 causes the main clutch 53 to be disengaged in the manner as described before. After this operation has been completed, the computer 61 feeds a signal to the solenoid 65a, causing the solenoid valve 65 to connect the chamber 64a with the accumulator 67. This causes the actuator 64 move the coupling sleeve 46 through the shift fork 63 into meshing engagement with the clutch gear 50. This meshing condition is held by a detent mechanism, not shown, though the computer 61 ceases to feed the signal to the solenoid 65a. At this time the computer 61 ceases to feed the signal to the clutch control device 60 and reengagement of the main clutch 53 takes place, so that engine power transferred from the countershaft 2 to the main shaft 3 through the gear 16, main gear 12 clutch gear 50, coupling sleeve 46 synchrohub 45.

Upon making an upshift to the fourth gear ratio, the computer 61 feeds a signal to the clutch control unit 60, disengaging the main clutch 53 in the same manner as described above, and while the main clutch is being disengaged, the computer 61 feeds a signal to the solenoid 66a, thus permitting the chamber 64b for the actuator 64 to connect with the accumulator 67. This causes the actuator 64 to move through a shift fork 63 the coupling sleeve 46 into meshing engagement with the clutch gear 49. Upon completion of this meshing operation, the computer 61 ceases to feed the signal to the solenoid 66a, but this meshing condition is held by a detent mechanism, not shown. Subsequently, the computer 61 ceases to feed the signal to the clutch control unit 60, resulting in reengagement of the main clutch 53. Accordingly, an upshift to the fourth gear ratio, the direct drive, is made wherein engine power on the input shaft 1 is transferred to the main shaft 3 through the gear 5, clutch gear 49, coupling sleeve 46 and clutch hub 45.

In order to render the transmission in a neutral state, as illustrated in FIG. 2, the computer 61 stops feeding signals to either the solenoids 65a, 66a, 71a, 72a, 73a or the clutch control unit 60. If the actuator 64 or 70 is not in its neutral or inoperative position, via, a position as illustrated in FIG. 2, the computer 61 feeds a signal to one of the solenoids 65a and 66a or one of the solenoids 71a and 72a until the actuator 64 or 70 is in the neutral position thereof. The computer 61 detects, by stroke sensing, the condition of the actuator 64 or 70 and will stop feeding the signal, thus ceasing the supply of pressure to the actuator 64 or 70 upon detection of the neutral position of the actuator 64 or 70. The coupling sleeves 46 and 25 are held in their inoperative positions, respectively, by detent mechanisms, not shown.

Upon selecting the reverse gear ratio, the computer 61 feeds a signal to the clutch control unit 60, thus disengaging the main clutch 53, and feeds a signal also to the solenoid 71a. This causes the solenoid valve 71 to introduce the pressure within the accumulator 67 into the chamber 70a to energize the actuator 70. The energization of the actuator 70 causes it to move the coupling sleeve 25 through the shift fork 69 into a position wherein the reverse gear 29 is in meshing engagement with the reverse idler gear 30. After this meshing operation is completed, the computer ceases to feed the signal to the solenoid 71a but the meshing condition is held by a detent mechanism, not shown. Subsequently, the computer 61, ceases to feed the signal to the clutch control unit 60, permitting reengagement of the main clutch 53. Accordingly, a selection to the reverse gear ratio is made wherein engine power is transferred from the gear 32 (ref. FIG. 1), through the shaft 31, reverse idler gear 25, reverse gear 29, coupling sleeve 25 and synchrohub 24, to the main shaft 3 to rotate same in the reverse rotational direction.

With the countershaft gear transmission as described above, an upshift to a gear ratio (the second gear ratio) subsequent to and from a low gear ratio (the first gear ratio) can be effected only by feeding a pressure to the multiple disc clutch 39 with the state for the low gear ratio being maintained and this can be effected without disengaging the main clutch 53 so that a jolting of the vehicle upon shifting which otherwise would occur due to the disengagement of the main clutch has been eliminated because of no interruption of the torque transfer upon shifting.

What is claimed is:

1. A countershaft gear transmission comprising:
   an input shaft;
   a countershaft drivingly connected to said input shaft;
   a main shaft;
   a one way clutch including an inner first race surrounded by an outer second race, said second race being formed with a first main gear, said first race being rotatably mounted on said main shaft and having an extension protruding axially away from said first main gear through and beyond a bearing rotatably supporting said extension;
   a second main gear rotatably mounted on said main shaft;
   a first counter gear in constant meshing engagement with said first main gear and integral with said countershaft;
   a second counter gear in constant meshing engagement with said second main gear;
   means coupled with said main shaft for rotation therewith, for coupling the end of the extension on said first race of said one-way clutch with said main shaft in all forward gear ratios including a predetermined gear ratio and the next higher gear ratio;
   clutch means, coupled with said main shaft for rotation therewith, for coupling said second main gear with said main shaft in said higher gear ratio;
   the speed reduction between said first main gear and said first counter gear being smaller than that between said second main gear and said second counter gear,
   said one-way clutch being constructed such that it allows rotation of said first race to overrun said second race, thus absorbing a difference in rotational speed between said first race and said second race formed with said first main gear when said higher gear ratio is established, and such that when said predetermined gear ratio is established it allows unitary rotation of said first race and said second race formed with said first main gear,
   whereby shifting between said predetermined gear ratio and said higher gear ratio can be effected with said input shaft being subjected to torque stress.

2. A countershaft gear transmission as claimed in claim 1, wherein
   said clutch main gear coupling means is in the form of a hydraulically operated multiple disc clutch.

* * * * *